(12) United States Patent
Forrest

(10) Patent No.: US 6,591,972 B1
(45) Date of Patent: Jul. 15, 2003

(54) GRAIN LEVELING APPARATUS FOR UNIFORMLY FILLING A GRAIN WAGON

(76) Inventor: Glen Forrest, 7916 E. 3400 North Rd., Potomac, IL (US) 61865

( * ) Notice: Subject to any disclaimer, the term of this patent is extended or adjusted under 35 U.S.C. 154(b) by 43 days.

(21) Appl. No.: 10/032,473

(22) Filed: Jan. 2, 2002

(51) Int. Cl.[7] .............................................. B65G 11/20
(52) U.S. Cl. ........................ 198/532; 193/23; 193/29; 193/31 A
(58) Field of Search ................ 198/532, 550.2; 193/14, 23, 29, 31 R, 31 A, 17, 20, 21

(56) References Cited

U.S. PATENT DOCUMENTS

| | | | | |
|---|---|---|---|---|
| 261,873 A | * | 8/1882 | Dickson | 431/270 |
| 460,630 A | * | 10/1891 | Choen | 209/257 |
| 782,485 A | * | 2/1905 | Campbell | 193/16 |
| 888,645 A | * | 5/1908 | O'Hearne | 193/3 |
| 1,259,421 A | * | 3/1918 | McArthur | 193/31 R |
| 1,531,788 A | * | 3/1925 | Jefferson | 68/177 |
| 1,534,023 A | * | 4/1925 | Betton | 193/14 |
| 1,637,416 A | | 8/1927 | Hunt | |
| 3,048,282 A | | 8/1962 | Reiff | |
| 3,235,051 A | * | 2/1966 | Cochran | 193/23 |
| 4,347,922 A | | 9/1982 | Curry et al. | |
| 4,522,291 A | * | 6/1985 | Smick | 193/23 |
| 4,603,769 A | | 8/1986 | Bach et al. | |
| 4,697,686 A | | 10/1987 | West | |
| 4,902,185 A | | 2/1990 | Dixon et al. | |

FOREIGN PATENT DOCUMENTS

GB    2151338 A  *  7/1985  ........... F16K/11/00

* cited by examiner

Primary Examiner—Christopher P. Ellis
Assistant Examiner—Mark A. Deuble
(74) Attorney, Agent, or Firm—Siemens Patent Services, LC

(57) ABSTRACT

The present invention features a grain distribution apparatus having a top loading intake hopper adapted for direct attachment to the discharge end of a grain auger or similar conveyor. A pair of hingedly connected, movable discharge spouts each receive a portion of the incoming grain stream. Some of the incoming grain is directly discharged from the bottom of the intake hopper. Intermediate discharge ports located along each of the discharge spouts also allow controlled amounts of grain to be discharged. All remaining grain is discharged from the terminal (i.e., distal) ends of the discharge spouts. By controlling the angle of the discharge spouts with respect to a horizontal plane, the pattern of grain discharge by the apparatus may be controlled.

18 Claims, 4 Drawing Sheets

GRAIN LEVELING APPARATUS FOR UNIFORMLY FILLING A GRAIN WAGON

FIELD OF THE INVENTION

The present invention relates to grain spreaders and, more particularly, to an apparatus for use with a grain auger or similar grain conveyor to distribute grain or the like discharged from the conveyor uniformly in a grain wagon or similar container.

BACKGROUND OF THE INVENTION

Discussion of the Prior Art

The result of many agricultural processes is a stream of fine particulate matter, typically grain or the like, which must be transported to storage or to a subsequent processing step. The term grain will be used herein to refer to any particulate matter, either organic or inorganic. The stream of grain is typically removed from the processing apparatus by a grain conveyor, often a grain auger or similar screw conveyor. At the discharge ends of these conveyors, the grain is typically collected, often in a grain wagon or similar conveyance. If such a wagon is positioned centrally under the discharge end of the grain conveyor, soon a central, conical pile of grain accumulates in the wagon. Often the top of the pile will exceed the height of the wagon sides, perhaps even reaching the conveyor discharge before the pile spreads to the corners of the grain wagon. Heretofore, either a person was required to enter the wagon and manually redistribute the grain or, alternatively, the grain wagon periodically needed to be moved incrementally to facilitate more uniform filling. The first of these techniques is labor-intensive, exposes the worker to possible danger from a collapsing grain pile as well as grain dust, and also exposes the grain to unnecessary contamination. The second of these techniques involves keeping a tractor or similar motive device attached to the grain wagon at all times, thereby tying up the tractor which could possibly be used more effectively elsewhere.

Various solution to the problem have been proposed and shown in the prior art. For example, U.S. Pat. No. 1,637,416 for FEEDING OR CONDUCTING TUBE FOR AGRICULTURAL DRILLS OR CULTIVATORS, issued Aug. 2, 1927 to Clarence Hunt teaches one such apparatus. A top loading hopper is connected to two or more discharge spouts. A central septum in the hopper evenly divides a stream of grain entering the hopper, directing the stream to the discharge spouts. The discharge spouts are capable of some movements which may be imparted remotely via a mechanical linkage. HUNT teaches no regulation of flow nor any way to proportion the relative grain outputs from the two discharge spouts.

In contradistinction, the inventive apparatus is specifically designed to uniformly fill a grain wagon or similar container. A top filled hopper allows an entering grain stream to be directed to at least five different outlets. First, some grain is allowed to flow through the hopper and be deposited directly beneath the hopper. A pair of discharge spouts are hingedly connected to the hopper to each receive another portion of the grain stream. These spouts extend laterally from the hopper at an angle sufficient to direct grain emerging from the distal, discharge ends a suitable distance away from the hopper. Intermediate openings suitably equipped with a valve flap or similar metering device and positioned in the bottom of these discharge spouts, provide additional discharge points intermediate the central discharge from the hopper and the discharge from the distal ends of the discharge spouts. By controlling the angle of the discharge spouts relative to the horizontal, the inventive apparatus may control the overall filling pattern in a grain wagon or the like positioned beneath the inventive distribution apparatus.

U.S. Pat. No. 3,048,282 for ARRANGEMENT FOR LOADING BULK MATERIAL INTO COMPARTMENTS ARRANGED ALONGSIDE EACH OTHER, issued Aug. 7, 1962 to Wilhelm Reiff, et al., teaches another stream splitting arrangement. A top loading hopper is connected to dual discharge drop pipes. These drop pipes may be moved in only a vertical direction and extended into the filling hatch of a ship or other similar arrangement having multiple storage holds or compartments arranged adjacent one another. REIFF, et al., teach no means for changing either the horizontal position or the angle of the drop pipes and no intermediate discharge points are located along the length of the drop pipes.

U.S. Pat. No. 4,347,922 for GRAIN DISTRIBUTOR ASSEMBLY FOR AN ELEVATOR, issued Sep. 7, 1982 to Robert D. Curry, et al., teaches a grain distributor for a grain elevator. A manifold plate with a plurality of openings is provided to feed a number of downspouts. A distributor plate having a single orifice is rotated to expose only a single opening in the manifold plate. A primary object of the construction is that the manifold plate serves as a firestop so that a fire or explosion in one of the downspouts is not transmitted through the grain distributor to other downspouts. CURRY et al., disclose no multiple output, repositionable grain distribution device such as that of the present invention.

U.S. Pat. No. 4,603,769 for GRAIN CHUTE SYSTEM, issued Aug. 5, 1986 to Bert Bach, et al., teaches an apparatus for controlling the vertical distribution of a grain stream within a silo or other permanent installation. A series of flap doors on the BACH, et al., apparatus remain closed by gravity until forced open by material within the central core of the grain chute. As the silo fills, doors in increasingly higher regions of the chute are opened as lower doors are pressed shut by the grain in the silo outside the chute. The dust mixed with the grain is separated from falling grain in the chute and may be effectively exhausted from above the chute. Unlike the inventive structure, the BACH, et al., chute is permanently installed within a permanent structure and would be unsuitable for filling a grain wagon or other similar structure. Also, there is no provision to control the horizontal distribution of grain.

U.S. Pat. No. 4,697,686 for GATE FOR SPLITTING A FLOW OF GRANULAR MATERIAL, issued Oct. 6, 1987 to Henrik West teaches an adjustable, angled splitting gate whereby an incoming material stream may be adjustably directed into two or more outlets. However, no teaching is provided for uniformly distributing discharged material in a uniform manner into a grain wagon or the like. No adjustable, lateral discharge spouts having intermediate discharge ports are provided.

U.S. Pat. No. 4,902,185 for GRAIN SPREADER, issued Feb. 20, 1990 to Carl R. Dixon teaches a motor-driven, rotating top-fed distributor for continuously distributing an incoming grain stream into plural, angled chutes. The apparatus of the present invention, on the other hand, uses no motor-driven component to facilitate grain distribution, but rather relies upon a pair of hinged, movable discharge chutes having intermediate discharge ports to uniformly distribute a grain stream into a substantially rectangular container such as a grain wagon.

None of these patents, either individually or in any combination are seen to teach or suggest the grain distribution apparatus of the present invention.

It is therefore an object of the invention to provided a grain distribution apparatus for directing an incoming stream of grain so as to uniformly fill a grain wagon or similar elongated collection container.

It is another object of the invention to provide a grain distribution apparatus having a plurality of discharge opening disposed substantially linearly along a primary axis.

It is also an object of the invention to provide a grain distribution apparatus where terminal discharge ports may be positioned from a remote location.

It is a further object of the invention to provide a grain distribution apparatus having two discharge spouts hingedly connected to a central receiving hopper.

It is an additional object of the invention to provide a grain distribution apparatus wherein intermediate discharge ports are provided along the discharge spouts.

It is a still further object of the invention to provide a grain distribution apparatus wherein the flow from the intermediate discharge ports may be regulated.

It is another object of the invention to provide a grain distribution apparatus having a central discharge port substantially directly beneath the intake hopper of the grain distribution apparatus.

SUMMARY OF THE INVENTION

The present invention features a grain distribution apparatus having a top loading intake hopper adapted for direct attachment to the discharge end of a grain auger or similar conveyor. A pair of hingedly connected, movable discharge spouts each receive a portion of the incoming grain stream. Some of the incoming grain is directly discharged from the bottom of the intake hopper. Intermediate discharge ports located along each of the discharge spouts also allow controlled amounts of grain to be discharged. All remaining grain is discharged from the terminal (i.e., distal) ends of the discharge spouts. By controlling the angle of the discharge spouts with respect to a horizontal plane, the pattern of grain discharge by the apparatus may be controlled.

BRIEF DESCRIPTION OF THE DRAWINGS

A complete understanding of the present invention may be obtained by reference to the accompanying drawings, when taken in conjunction with the detail description thereof and in which.

DESCRIPTION OF THE PREFERRED EMBODIMENT

Generally speaking this invention relates to a grain distributor for use in conjunction with a grain auger or similar conveyor system to uniformly distribute a stream of grain received from the grain auger into a grain wagon or similar receptacle.

Figure 1:
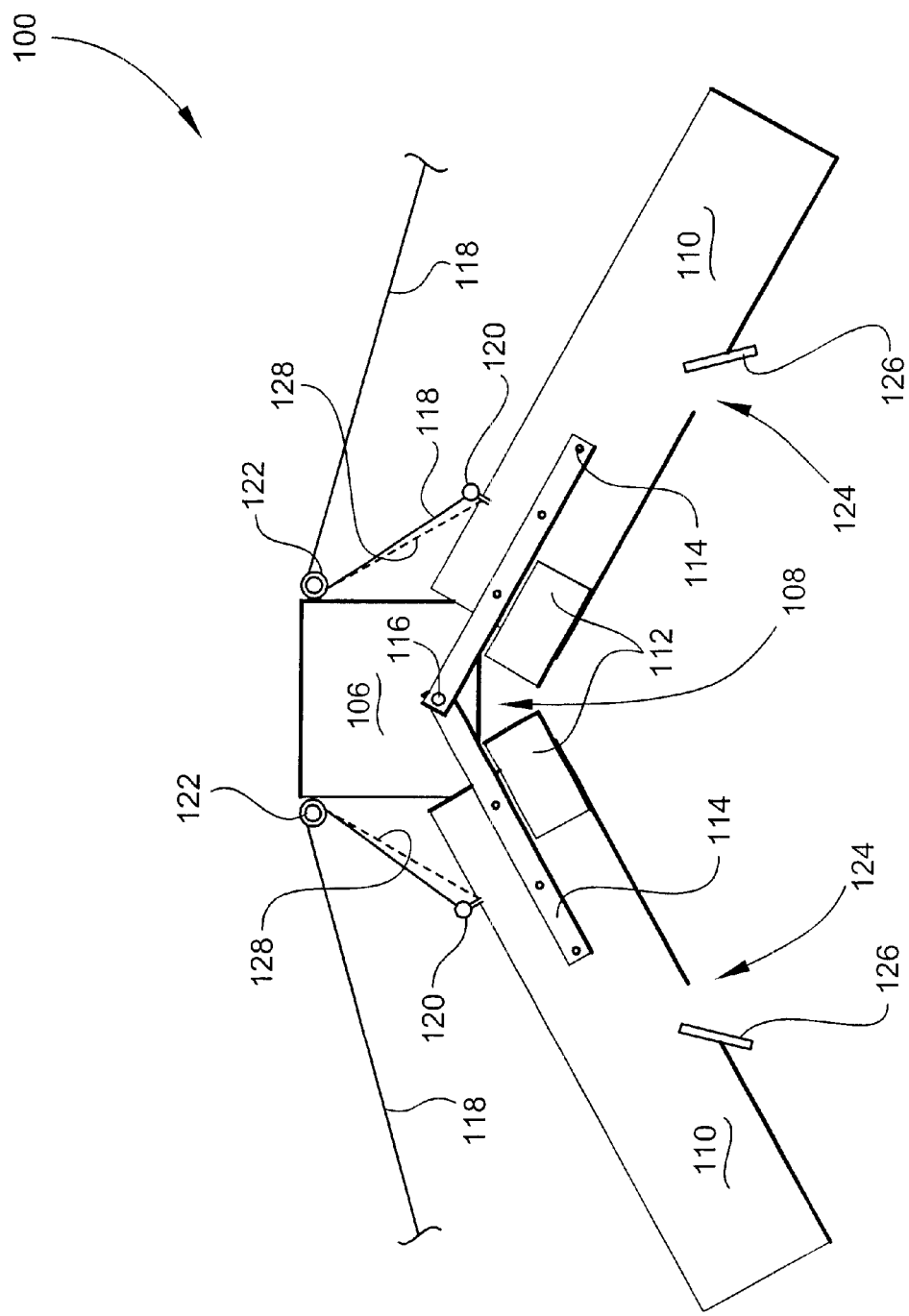
FIG. 1 is a side schematic view of the grain distribution apparatus disposed in a normal, operational position.

Referring first to FIG. 1, there is shown a side, schematic view of the grain distribution of the invention, generally at reference number 100. A hopper 106, typically cylindrical and having both an open top and bottom, supports a pair of discharge chutes or spouts 110 through support members 114. Support members 114 are pivotally attached to hopper 106 at pivot point 116. In the embodiment chosen for purposes of disclosure, hopper 106 is fabricated from a piece of PVC pipe. It will be recognized by those skilled in the art that hopper 106 need not necessarily be cylindrical but could be conical, rectangular, or virtually and other shape. In addition, hopper 106 could be fabricated from many different materials such as sheet metal or fiberglass, as well as a variety of different polymers. In the embodiment chosen for purposes of disclosure, hopper 106 has a completely open bottom. In alternate embodiments, a disk or other suitable structure having an orifice, of either fixed or variable size, could be used to partially seal the bottom region 108 of hopper 106.

Discharge spouts 110 are typically cylindrical, each having a proximal end terminating in a semi-circular scoop 112 located adjacent to lower region 108 of hopper 106. Discharge spouts 110 with attached scoops 112 are pivotally mounted to hopper 106 and supported by support members 114 extending along both their front and rear sides. Support members 114 are attached to hopper 106 at pivot 116 and supported from hopper 106, typically by a bolt (not shown) or other suitable fastener (not shown) extending across the diameter of hopper 106. It would be evident to one skilled in the art that a shorter bolt (not shown) on either side of hopper 106 could be used in lieu of a single bold passing from side to side of hopper 106. Intermediate discharge ports 124 are disposed in the bottoms of discharge chutes 110. Adjustable flaps 126 allow regulation of the amount of material to be discharged from intermediates discharge ports 124. Flaps 126 may be either fixed flaps or, in alternate embodiments, could be pivotally mounted to discharge chutes 110 to vary the amount of material being discharged from discharge ports 124. In still other embodiments, a slidable sleeve (not shown) could be used to control the amount of discharge port 124 that is exposed, thereby also controlling the amount of particulate mater discharged therefrom.

Scoops 112 are open on their tops and are adapted to receive a portion of a grain stream (not shown) being discharged from bottom region 108 of hopper 106.

Figure 3:
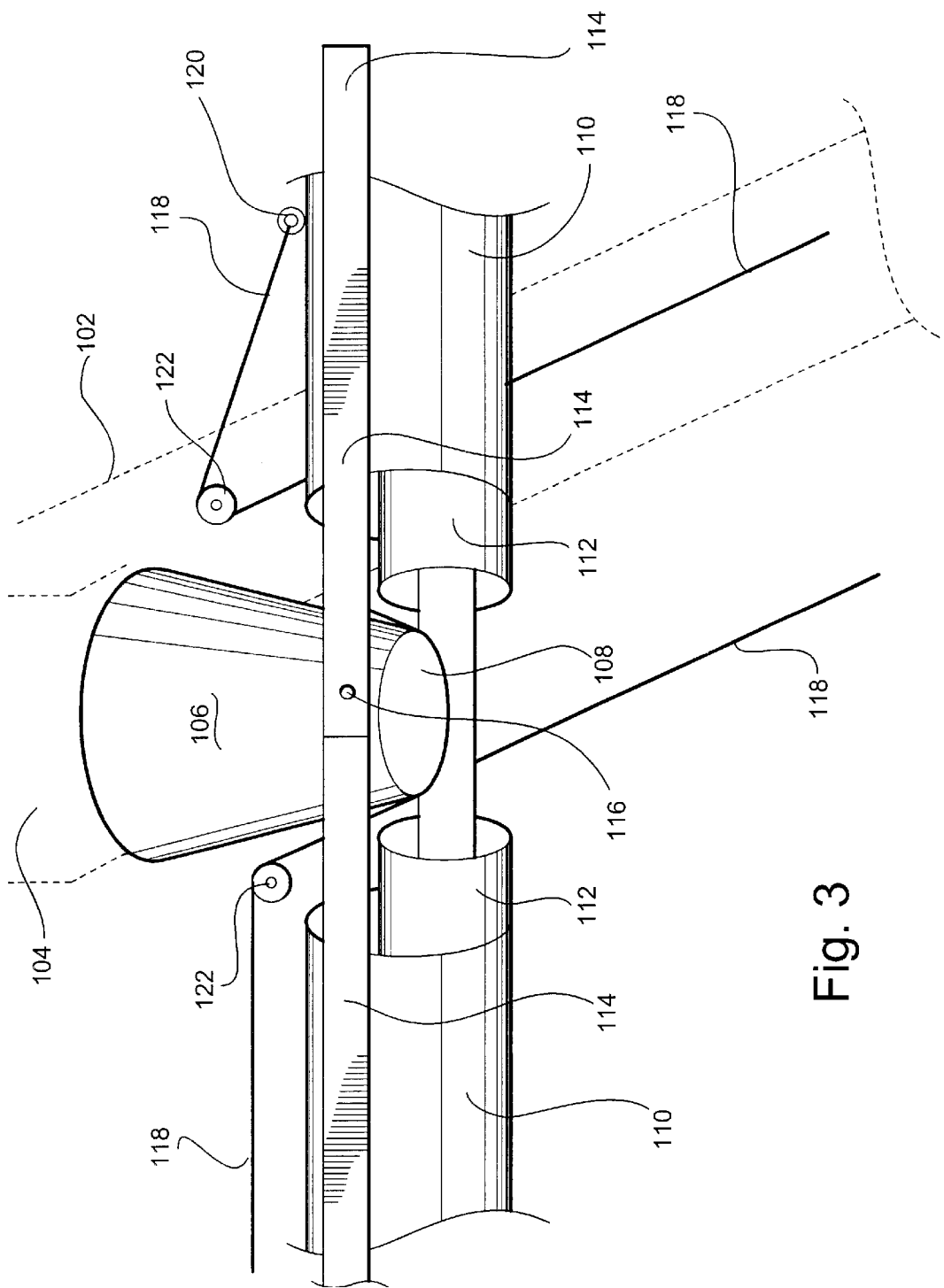
FIG. 3 is a bottom perspective, schematic view of the grain distribution apparatus of the invention in a raised position.

Ropes 118 are fastened to eye bolts 120 disposed in an upper surface of discharge spouts 110. The term rope has been used to refer to a rope, cable, halyard or other similar structure. It will be recognized by those of skill in the art that rope 118 could be formed from cotton, hemp, nylon, polypropylene or any other suitable material normally used for ropes. In addition, a woven or braided steel cable could form rope 118. Ropes 118 pass around pulleys 122 and are routed away from grain distribution apparatus 100, typically along, or at least parallel to, grain auger 102 (FIG. 3). As shown in FIG. 1, the grain distributing apparatus 100 is in a lowered, operational position. Tension provided on the distal ends of ropes 118 selectively and independently position one or both discharge chutes 110. In addition to ropes 118, tethers 128, are adjustably attached to hopper 106 and to discharge chutes 110. Tethers 128 limit the excursion of discharge chutes 110 away from a horizontal plane and allows the discharge chutes 110 to return to a predetermined position after being raised by ropes 118 so as to provide vertical clearance for a tractor (not shown), the grain wagon, or the like to pass under grain distribution apparatus 100. In the embodiment chosen for purposes of disclosure, tethers 128 are chains whose length may be adjusted selectively by using an S-hook or similar device to selectively engage a particular link of the chain thereby adjusting its length. It will be recognized that tethers 128 could be embodied in other different ways, well known to those of skill in the art.

Figure 2:
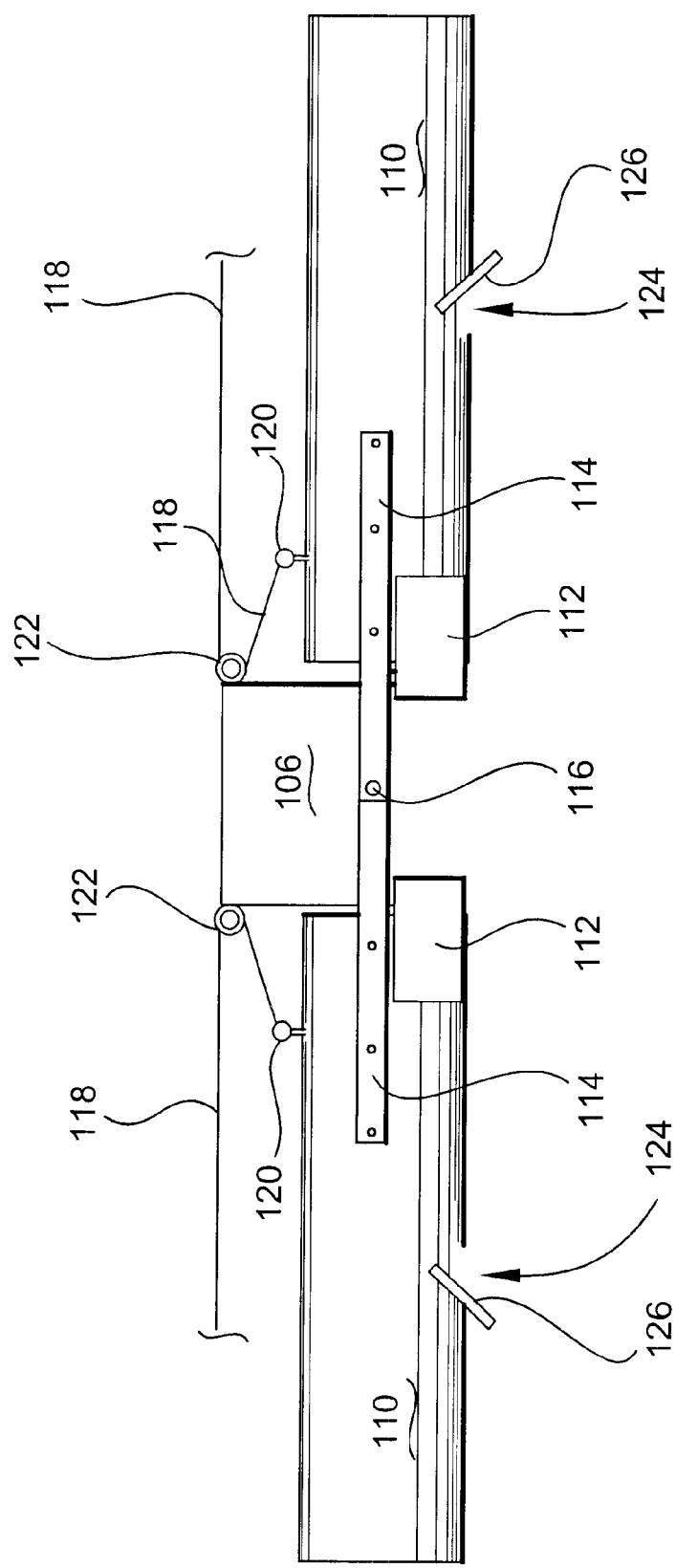
FIG. 2 is a side schematic view of the grain distribution apparatus of FIG. 1 but disposed in a raised position.

Referring now to FIG. 2, there is shown a side schematic view of the grain distribution apparatus 100 with discharge chutes 110 shown in a raised, horizontal position. Discharge chutes 110 are raised from the operational positions as shown in FIG. 1 by pulling ropes 118. With discharge chutes 110 in their raised, horizontal position, a tractor may readily be driven under grain distribution apparatus 100 to facilitate placement of a grain wagon 130 (FIG. 4) directly under the discharge regions of the grain distribution apparatus 100. Once the grain wagon is in place, discharge chutes 110 may again be lowered. Tethers 128 are adjusted so that as ropes 118 are released, discharge chutes 110 return to a predetermined operating angle as best seen in FIGS. 1 and 4.

Figure 4:
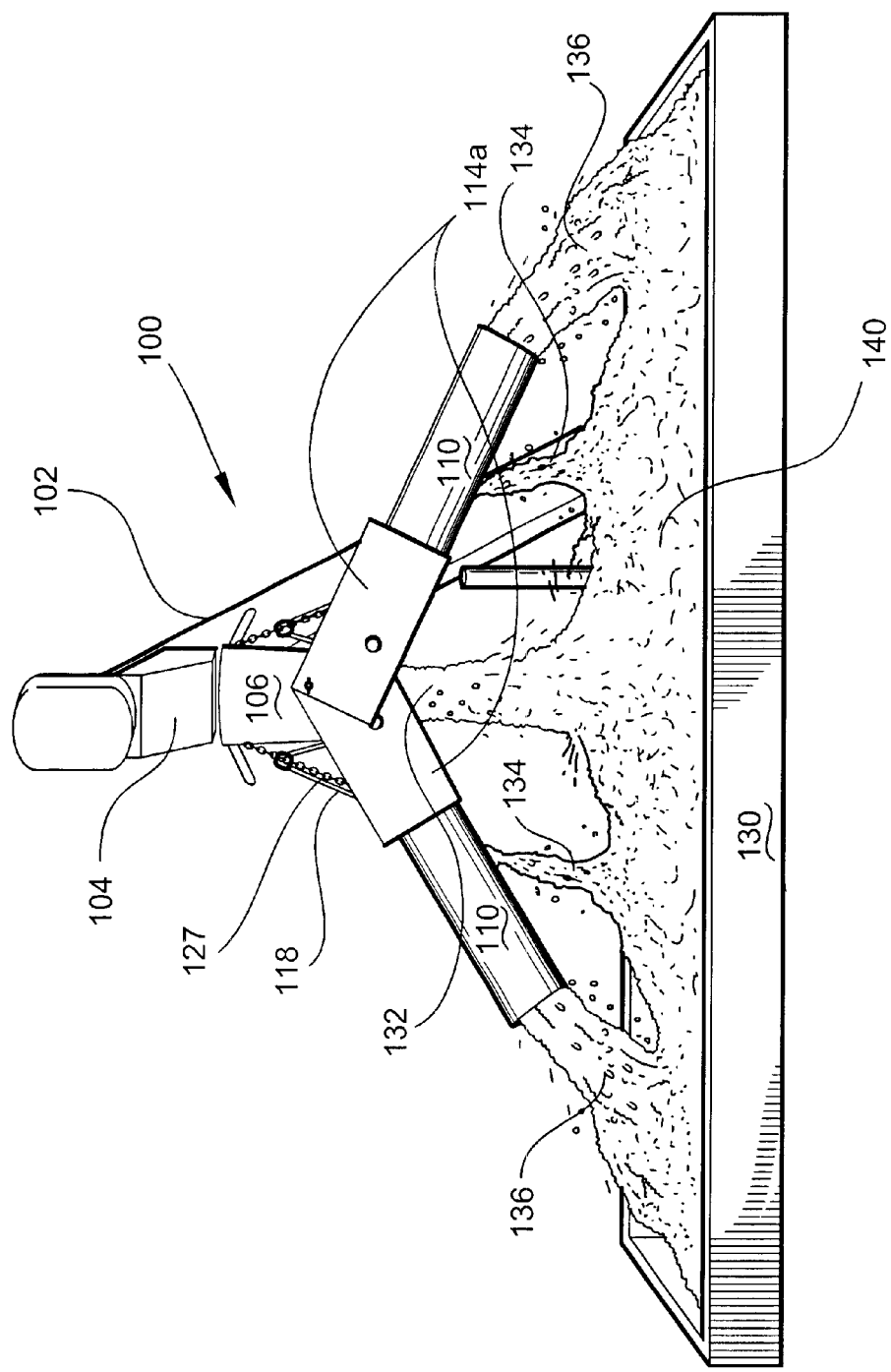
FIG. 4 is a rear elevational view of the grain distribution apparatus of the invention function in its intended operating environment.

Referring now to FIG. 3, there is shown a bottom perspective, schematic view of a central portion of the grain distribution apparatus 100 attached to a grain auger 102 (FIG. 4). The upper portion of grain auger 102 is shown in phantom. Grain augers and similar conveyors are well known to those skilled in the art and forms no part on the instant invention. The discharge end of a typical grain auger 102 is typically equipped with a discharge chute (not shown) to help guide, direct and focus the grain stream (not shown) downward. The grain distribution apparatus 100 of the invention is designed for attachment to grain auger 102 to replace the discharge chute (not shown), using the same mounting holes, when possible. The inventive grain distribution apparatus 100 may, however, be attached to a grain auger 102 using any means known to those of skill in the design of such equipment. Grain receiving hopper 106 is positioned directly beneath the discharge region 104 of grain auger 102 so as to receive the stream of grain (not shown) being discharged from grain auger 102. The lower region 108 of hopper 106 may be completely open or, in alternate embodiments may be partially closed. A pair of cylindrical discharge spouts 110, each having a proximal end terminating in a semi-circular scoop 112 located adjacent to lower region 108 of hopper 106. Discharge spouts 110 with attached scoops 112 are pivotally mounted to hopper 106 and supported by support members 114 extending along both their front and rear sides. Support members are attached to hopper 106 at pivot 116 and supported from hopper 106, typically by a bolt (not shown) or other suitable fastener (not shown) extending through the diameter of hopper 106. As previously stated, it would be evident to one skilled in the art that a shorter bolt (not shown) on each of the two sides of hopper 106 could be used in lieu of a single bold passing through hopper 106 from side to side. Ropes 118 are shown routed along or parallel to grain auger 102 to an accessible point. Tethers 128 (FIG. 1) have been omitted from FIG. 3 for purposes of clarity.

Referring now to FIG. 4, there is shown a front, elevational view of an alternate embodiment of the grain distribution apparatus 100 of the invention in use distributing grain into a grain wagon 130. Support 114 (FIGS. 1, 2, 3) have been replace by polymer supports 114a which perform the same function as supports 114. A central grain stream 132 is seen falling through hopper 106 into a middle region of grain wagon 130. Two additional grain streams 134 are seen being discharging from intermediate discharge ports 124 and falling to the right and left of grain stream 132. Finally, grain streams 136 are seen emerging from the distal ends of discharge chutes or spouts 110. As may be seen, the top level of the grain 140 in wagon 130 is relatively uniform. Consequently, there is no need either for manual redistribution of the grain or for periodically repositioning the grain wagon to facilitate even filling.

It will be recognized that the lengths of discharge spouts 110 could be altered to change the distribution pattern of the grain or to accommodate a longer grain wagon 130. Additional intermediate discharge ports could also be added. It will also be recognized that because discharge chutes 110 are independently manipulatable via ropes 118, the discharge chutes could be deployed at different heights and/or lengths which would also vary the distribution pattern of grain entering wagon 130. As previously stated, the use of the inventive structure is not limited to grain but could be used in handling/distributing almost any particulate or granular matter.

Since other modifications and changes varied to fit a particular operating requirements and environment will be apparent to those skilled in the art, the invention is not considered limited to the example chosen for purposes of disclosure, and covers all changes and modifications which do not constitute a departure from the true spirit and scope of the invention.

Having thus described the invention, what is desired to be protected by Letters Patent is presented in the subsequent appended claims.

What is claimed is:

1. A grain distribution apparatus, comprising:
   a) A substantially vertical, hollow hopper having an open top and an at least partially open bottom and adapted to receive a stream of particulate matter at said open top;
   b) at least one discharge chute pivotally affixed to said hopper and having a proximal end adapted to receive particulate matter from said at least partially open bottom of said hopper, said at least one discharge chute having a distal end adapted to discharge said particulate matter received at said proximal end thereof;
   c) means for varying the angle of said at least one discharge chute relative to a horizontal plane;
      whereby particulate matter entering said top of said hopper is divided into at least two portions, a first portion being discharged through said bottom of said hopper and a second portion entering said proximal end of said at least one discharge chute and being discharged from said distal end thereof.

2. The grain distribution apparatus as recited in claim 1, wherein said hopper is substantially cylindrical and said bottom of said cylinder is substantially open.

3. The grain distribution apparatus as recited in claim 2, wherein said hopper comprises a length of PVC pipe.

4. The grain distribution apparatus as recited in claim 1, wherein each of said at least one discharge chutes comprises a scoop intermediate said proximal end of said discharge chute and said bottom of said hopper, said scoop being adapted to intercept said second portion of said stream of particulate matter received at said top of said hopper.

5. The grain distribution apparatus as recited in claim 4, wherein said at least one discharge chute is cylindrical.

6. The grain distribution apparatus as recited in claim 5, wherein said at least one discharge chute comprises a pair of discharge chutes, each hingedly attached to said hopper and disposed substantially opposed to one another.

7. The grain distribution apparatus as recited in claim 6, wherein at least one of said pair of discharge chutes comprises an opening adapted to discharge at least a portion of said particulate matter, said opening being disposed in a bottom region of said at least one of said pair of discharge chutes, said opening being disposed a predetermined distance between said proximal and said distal ends of said at least one of said pair of discharge chutes.

8. The grain distribution apparatus as recited in claim 7, wherein at least one of said discharge chutes comprises a control member proximate said opening, said control member being adapted to regulated the amount of particulate matter discharged from said opening.

9. The grain distribution apparatus as recited in claim 8, wherein said control member comprises a control flap proximate said opening, said control flap being adapted to regulated the amount of particulate matter discharged therefrom.

10. The grain distribution apparatus as recited in claim 8, wherein said control member comprises a movable sleeve adapted to selectively cover said opening to regulated the amount of particulate matter discharged therefrom.

11. The grain distribution apparatus as recited in claim 1, wherein said means for varying the angle of said at least one discharge chute comprises a pulley affixed proximate said hopper and a rope having a proximal end and a distal end, said proximal end of said rope being affixed to said at least one discharge chute intermediate said proximal and said distal ends thereof, said rope being in slidable relationship with said pulley, said distal end of said rope being disposed remote from said hopper;

whereby movement of said distal end of said rope causes movement of said at least one discharge chute.

12. The grain distribution apparatus as recited in claim 11, further comprising: a tether having a first end affixed proximate said hopper and a second end affixed proximate said point of affixation of said proximal end of said tether on said at least one discharge chute, the length of said tether determining the maximum deviation from a horizontal plane of said at least one discharge chute.

13. The grain distribution apparatus as recited in claim 12, wherein said tether comprises means for adjusting the effective length between said proximal and said distal ends thereof.

14. The grain distribution apparatus as recited in claim 13, wherein said tether comprises a chain having a plurality of links and said means for adjusting the effective length between said proximal and said distal ends thereof comprises means for selecting a predetermined one of said plurality of links.

15. The grain distribution apparatus as recited in claim 14, wherein said means for adjusting the effective length between said proximal and said distal ends thereof comprises an S-hook.

16. A grain distribution apparatus, comprising:
a) A substantially cylindrical, vertically-oriented, hollow hopper having an open top and an open bottom and adapted to receive a stream of particulate matter at said open top;
b) a pair of substantially cylindrical discharge chutes pivotally affixed to said hopper and disposed substantially opposed to one another, each of said discharge chutes having a proximal end comprising a scoop fixedly connected thereto and adapted to receive particulate matter from said open bottom of said hopper, said pair of discharge chutes each having a distal end adapted to discharge said particulate matter received at said chute;
c) means for varying the angle of at least one of said pair of discharge chutes relative to a horizontal plane, comprising a pulley affixed proximate said hopper and a rope having a proximal end and a distal end, said proximal end being affixed to said one of said pair of discharge chutes intermediate said proximal end and said distal end thereof, said rope being in slidable relationship with said pulley, said distal end of said rope being disposed remote from said hopper; and a chain having a first end affixed proximate said hopper and a second end affixed proximate said point of affixation of said proximal end of said rope on said at least one discharge chute, the length of said chain determining the maximum deviation from a horizontal plane of said at least one of said pair of discharge chutes;

whereby particulate matter entering said top of said hopper is divided into at least two portions, a first portion being discharged through said bottom of said hopper and a second portion entering said scoops at said proximal ends of said pair of discharge chutes and being discharged from said distal ends thereof.

17. The grain distribution apparatus as recited in claim 16, wherein said particulate matter comprises grain.

18. The grain distribution apparatus as recited in claim 17, wherein said discharged grain is accumulated in a grain wagon.

* * * * *